United States Patent [19]

Schoubye

[11] Patent Number: 5,116,585
[45] Date of Patent: May 26, 1992

[54] PROCESS FOR PURIFICATION OF OFFGASES

[75] Inventor: Peter Schoubye, Hørsholm, Denmark

[73] Assignee: Haldor Topsoe A/S, Denmark

[21] Appl. No.: 606,113

[22] Filed: Oct. 31, 1990

[30] Foreign Application Priority Data

Jun. 8, 1990 [DK] Denmark .............................. 1401/90

[51] Int. Cl.$^5$ ....................... C01B 21/00; C01B 7/00; C01B 17/00
[52] U.S. Cl. ................................ 423/235; 423/240 R; 423/242; 423/240 S
[58] Field of Search .............. 423/242 A, 235, 235 D, 423/240 R, 240 S, 242 R

[56] References Cited

U.S. PATENT DOCUMENTS

| | | | |
|---|---|---|---|
| 3,645,671 | 2/1972 | Griffin et al. | 423/242 |
| 3,883,643 | 5/1975 | Renault et al. | 423/242 |
| 4,180,550 | 12/1979 | Deschamps et al. | 423/242 |
| 4,250,160 | 2/1981 | Eakman | 423/242 |

*Primary Examiner*—Gregory A. Heller
*Attorney, Agent, or Firm*—Ostrolenk, Faber, Gerb & Soffen

[57] ABSTRACT

The invention relates to a process for the removal of acidic gaseous compounds from a stream of offgas by introducing into the gasstream a core-gas containing solid particles with a diameter of between about 40 and 1000 Å and treatment of the obtained gasmixture with ammonia.

7 Claims, No Drawings

PROCESS FOR PURIFICATION OF OFFGASES

The present invention relates to a process for purification of offgases and more particular to the elimination of acidic gaseous compounds in those gases by treatment with ammonia.

It is known to eliminate acidic gaseous compounds, such as $SO_2$, HCl, $SO_3$, HF and $NO_2$, by scrubbing with aqueous ammonia solution. Thereby, acidic compounds are dissolved in water as ammonium salts, which then are recovered from the solution in known manner, such as by evaporation, crystallization and filtration of the formed salts.

It is further known to remove such acidic compounds from gases by addition of ammonia to the gases and by precipitation of the so formed ammonium salts as particles from the gases. These particles are separated from the gases in a subsequent jelly-bag or electrostatic filter at a temperature, where the ammonium salts have a convenient low vapour pressure.

A major drawback of the known processes is that the ammonium salts usually precipitate from the gas phase wholly or partly in form of aerosols with a particle size of between 0.2 and 2 micron ($\mu$m), which are difficult to separate from the gas phase by filtration or scrubbing of the gas. As a further drawback of the known processes the ammonium salts may condensate and form undesirable surface layers on the walls of the equipment used in the processes.

It is thus an object of the present invention to provide an improved process for removal of acidic gaseous compounds from offgases, by treatment with ammonia, by which process particles of formed ammonium salts are separated from the gas phase having a particle size, which prevents formation of undesirable aerosols of the ammonium salts.

The improvement according to the invention comprises adding to the gases previous to their treatment with ammonia a core-gas containing solid particles with a diameter of between 40 and 1000 Å.

These particles, hereinafter termed "cores", act as nucleation seeds during the condensation of ammonium salts. Thereby, it is assumed that one core forms a particle of ammonium salt with a particle size of at least about 3 $\mu$m, typically of between 4 and 10 $\mu$m.

As an advantageous feature of the inventive process, the tendency of the ammonium salts to deposit as undesirable coatings is diminished.

The cores may comprise silica, carbon as soot-particles, obtained by burning silicon oil or hydrocarbons or metal oxides. The cores may further be obtained from an electric arc.

The obtained cores are admitted to the offgas to be treated by introduction of smoke from burning the hydrocarbons or silicon oil into a burner in form of an aerosol, or by introduction of a suspension of particles of a metal salt, previously to the ammonia treatment of the offgas. The amount of core-gas introduced into the gas constitutes typically 1/500-1/1000 volumes of core-gas per volume gas to be treated.

Introduction of too many cores into the gas may result in formation of ammonium salt particles with a size too small for optimum separation in a subsequent filter or scrubbing unit. Furthermore, addition of insufficient amounts of cores leads to separation of ammonium salt particles as very small particles by homogeneous nucleation without the cores as nucleation seeds.

The principles of the present invention are further illustrated by the following description and Example.

Cores are prepared by mixing air with vapour of silicon oil, by e.g. passing the air through a bottle containing silicon oil. This silicon oil enriched air is then partly used as combustion air in a gas burner. In the burner, the silicon oil contained in the combustion air burns to small particles of silica with a diameter down to 40 Å in the obtained core-gas leaving the burner. The core-gas is then introduced into a stream of offgas, before the off and core-gas mixture is treated with ammonia by scrubbing with aqueous ammonia solution or addition of ammonia.

The present invention will be further illustrated by the following Example:

EXAMPLE

1000 $Nm^3/h$ of a stream of offgas containing 800 vol.ppm $SO_2$, 8 vol.ppm $SO_3$, 150 vol.ppm HCl and 7 vol% $H_2O$ were scrubbed with ammonia water in a scrubber unit provided with tower packings. The gas stream was artificially prepared by admixing the above compounds to a stream of air, which has been previously filtered through a "Goretex" membranefilter in order to remove particles present in the air. In a conventional procedure the offgasstream was passed via a line into scrubber unit at a temperature of about 100° C. The temperature of the gas leaving the scrubber unit and the temperature of the scrubber solution was maintained at 35° C.–40° C. by circulation through a water cooler.

The pH value of the scrubber solution was adjusted to a value of 6 by continuously adding ammonia to the scrubber solution. By this procedure removal of 95-98% of $SO_2$ and more than 99% of HCl and $SO_3$ in the gas was obtained, when analysing the gas after filtration. It was further observed that when lowering the pH value the rate of $SO_2$ removal decreases, and when rising the pH value large amounts of ammonia leave the scrubber unit along with the offgasstream.

The offgas from the scrubber unit showed further a visible content of aerosols of ammonium chloride and sulphate or hydrogensulphate corresponding to a content of 10-20 mole ppm Cl and about 3 mole ppm $SO_3$. The aerosol could be removed during the analysis of the gas by filtration through a filter of fibre glass, which retained particles down to about 0.5 $\mu$m. Less than 50% of the aerosol were removed by filtration through a 5 $\mu$m filter. The aerosol showed a bluish colour indicating that a large number of aerosol particles had a size of about 0.5 $\mu$m or less. By heating 1 $Nm^3/h$ of the aerosol containing gas to 250° C.–300° C. the aerosol was eliminated. The aerosol was reformed, when the warm gas was cooled to 50° C. in a 2 meter high glass tube. Less than 50% of this reformed aerosol could be removed by passage through a 5 $\mu$m filter. During cooling of the gas a layer of ammonium salts is deposited rapidly on the surface of the glass tube.

When employing the procedure according to the inventive process, the above offgas was admixed with 1 $Nm^3/h$ of core-gas prepared as described hereinbefore. The core-gas containing about 10 mg $SiO_2/Nm^3$ was introduced into the offgas before the scrubbing unit.

By using the same procedure as in the above conventional procedure, the nature of the aerosol had changed. The particles of the aerosol became larger in size, and more than 95% of the aerosol could be removed by a 5 $\mu$m filter.

The content of aerosol in the offgas, however, was about the same as without introduction of the core-gas. By heating the aerosol containing offgas to a temperature of 250° C.–300° C. the aerosol disappeared and was reformed after cooling in the glass tube as described above. The rate, at which layers of ammonium salts were formed on the surface of the glass tube was, however, reduced to less than 1/10 of the rate without introduction of the core-gas.

Furthermore, the reformed aerosol, which was purely white, could be removed by passage through a 5 μm filter.

A corresponding effect on the particle-size of aerosols of ammonium salts could be observed by using smoke from a cigarette or offgas from a luminous flame of burning butane gas.

Cores with large particle size such as 1–2 μm particles of fly ask, showed no effect or only a small effect on the aerosols of ammonium salts, probably because they were washed out in the scrubber unit.

What is claimed is:

1. An improved process for the removal of acidic gaseous compounds comprising sulphur dioxide, sulphur trioxide, hydrogen chloride, hydrogen fluoride and nitrogen dioxide from a stream of offgas by treatment with ammonia, the improvement of which comprises introduction of a core-gas containing solid particles of silica, carbon or metal oxides with a diameter of between about 40 and 1000 Å into the stream of offgas previous to the treatment with ammonia.

2. The process of claim 1, wherein the core-gas is introduced into the stream of offgas at an amount of between 1/500 and 1/1000 parts by volume core-gas per part by volume offgas.

3. The process of claim 1, wherein the core-gas is introduced by admixing smoke from burning of hydrocarbons or silicon oil.

4. The process of claim 1, wherein the core-gas is introduced in form of an aerosol or suspension of particles of a metal oxide.

5. The process of claim 1, wherein the core-gas is obtained in an electric arc.

6. The process according to claim 1, wherein the ammonia treatment is carried out by an aqueous ammonia solution in a scrubber unit filled with tower packings.

7. The process according to claim 1, wherein the offgas is passed through a 5 μm filter after the treatment with ammonia.

* * * * *